Figure 1B:
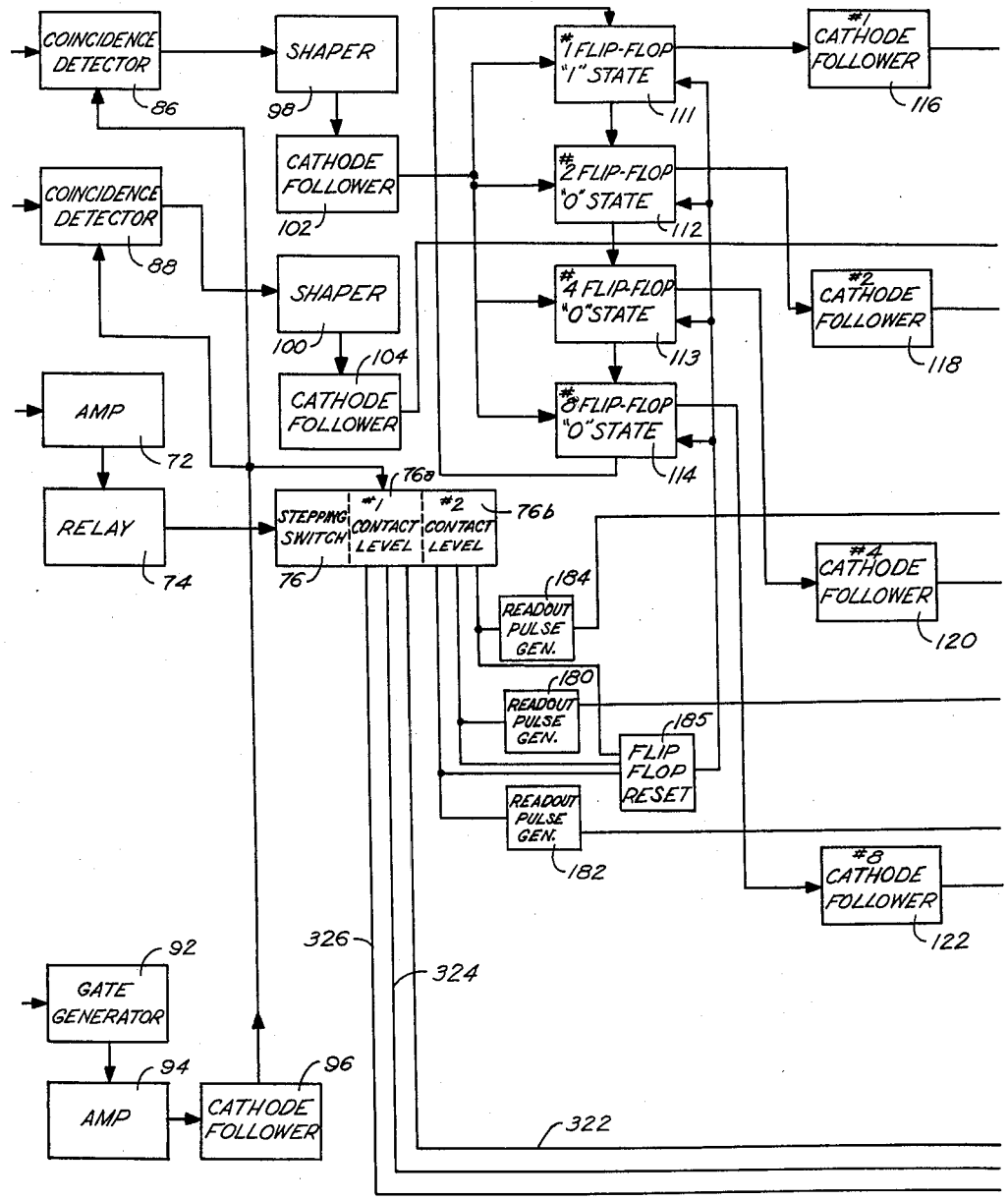

Feb. 5, 1963   E. J. HANKES ETAL   3,076,957
DATA PROCESSING SYSTEM
Filed May 9, 1958   6 Sheets-Sheet 1
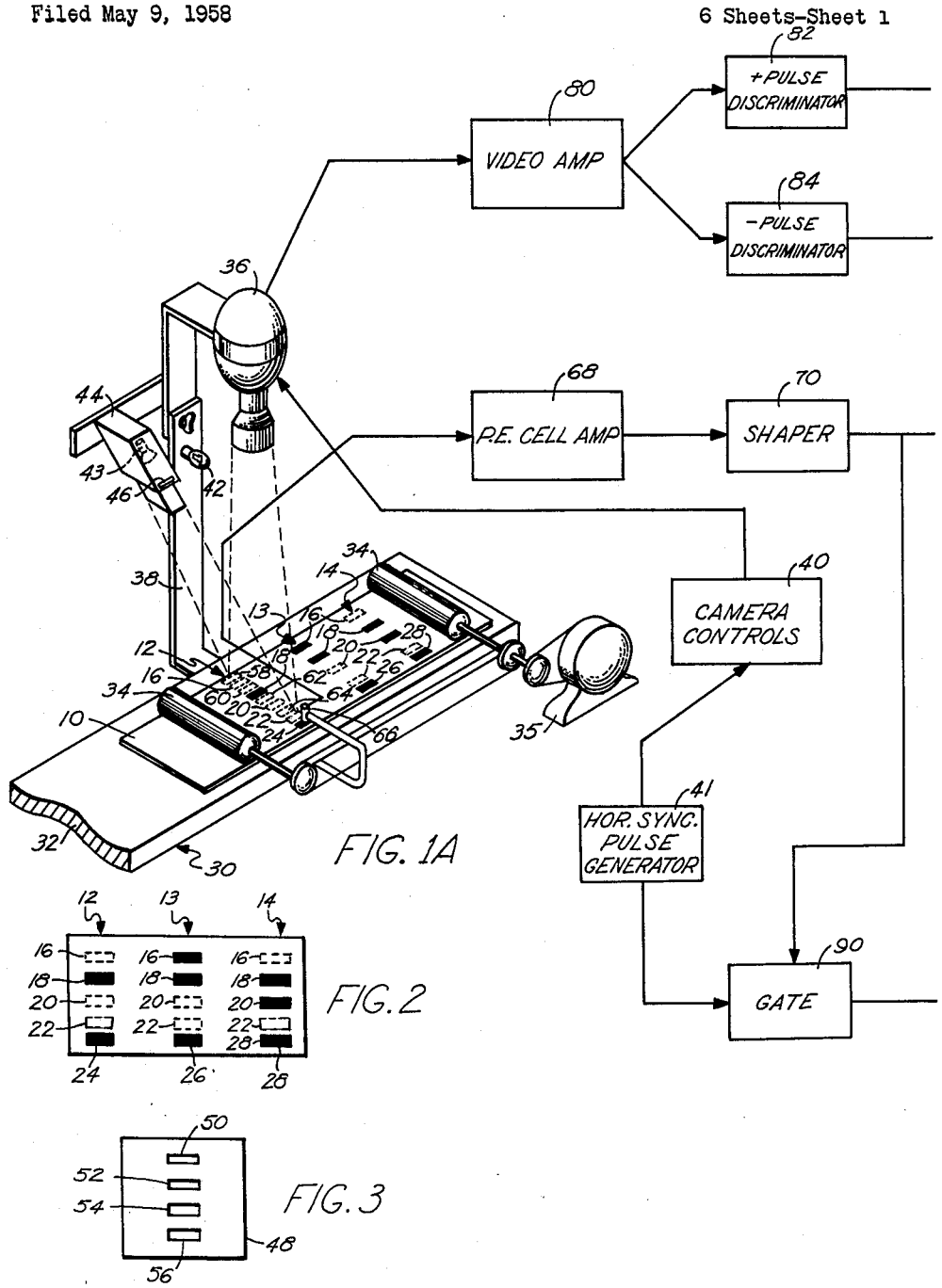
INVENTORS
ELMER J. HANKES
JOHN D. FIREHAMMER
BY ROBERT F. LAMBERT
*Stuart R. Peterson*
ATTORNEY Feb. 5, 1963    E. J. HANKES ETAL    3,076,957
DATA PROCESSING SYSTEM
Filed May 9, 1958    6 Sheets-Sheet 2

INVENTORS
ELMER J. HANKES
JOHN D. FIREHAMMER
BY ROBERT F. LAMBERT

Stuart R. Peterson
ATTORNEY

INVENTORS
ELMER J. HANKES
JOHN D. FIREHAMMER
ROBERT F. LAMBERT
BY Stuart R. Peterson
ATTORNEY Feb. 5, 1963

E. J. HANKES ETAL 3,076,957

DATA PROCESSING SYSTEM

Filed May 9, 1958

6 Sheets-Sheet 5

INVENTORS
ELMER J. HANKES
JOHN D. FIREHAMMER
BY ROBERT F. LAMBERT

Stuart R. Peterson
ATTORNEY

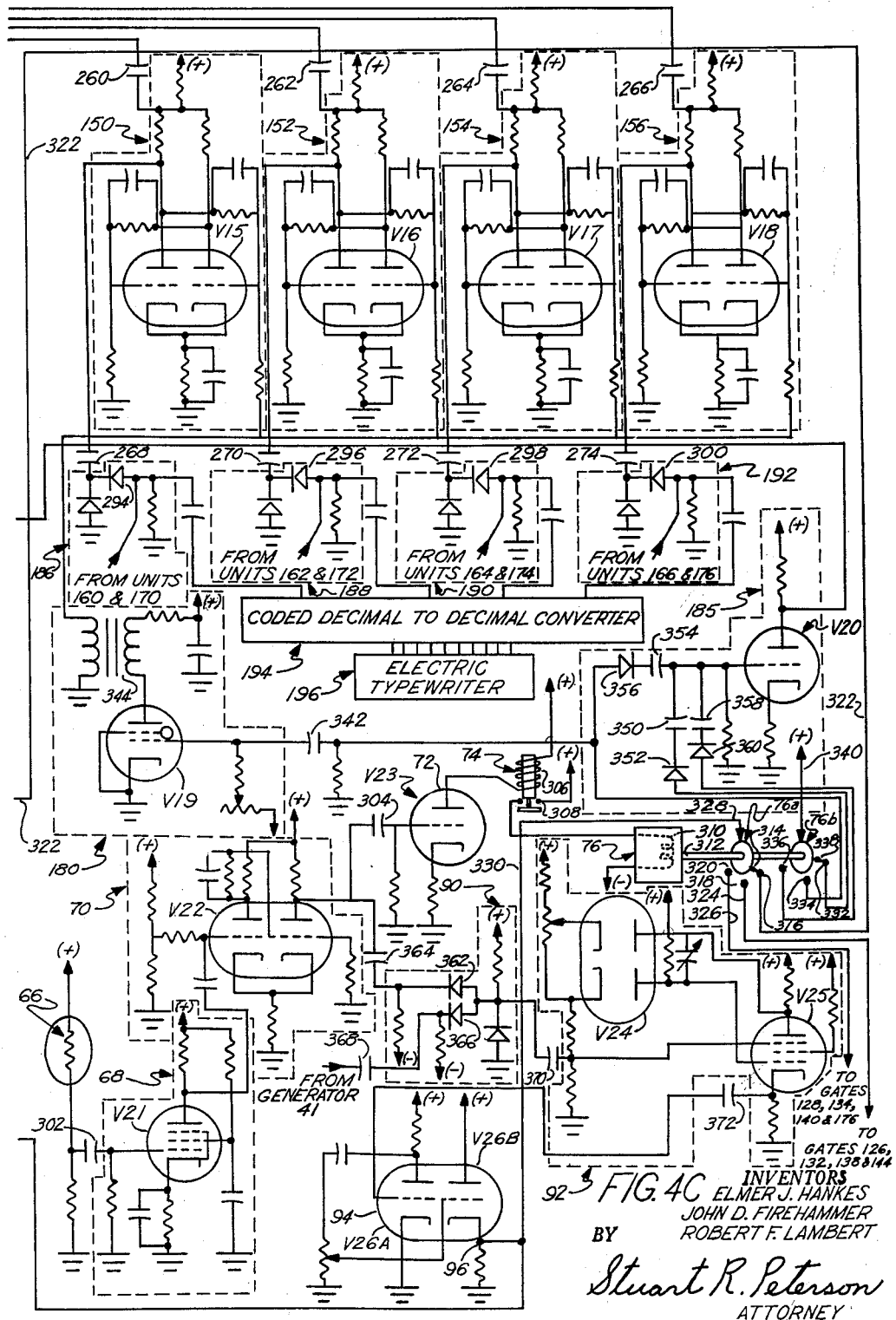

United States Patent Office 3,076,957
Patented Feb. 5, 1963

3,076,957
DATA PROCESSING SYSTEM
Elmer J. Hankes and John D. Firehammer, Minneapolis, and Robert F. Lambert, St. Paul, Minn.; said Firehammer and said Lambert assignors to said Hankes
Filed May 9, 1958, Ser. No. 734,137
19 Claims. (Cl. 340—173)

This invention relates generally to high-speed data processing machines, and pertains more particularly to an electro-optical system capable of reading information that has been marked at specified locations on a record card.

One object of the invention is to provide a data processing system that is quite rapid in its operation so that relatively large amounts of data can be processed in a comparatively short time. In this regard, it might be explained that the envisaged apparatus does not possess automatic random access capabilities as do some types of systems, a card type of storage herein being contemplated, but once the proper card has been selected, either manually or by mechanical means, the information contained thereon can be quickly analyzed.

A further object of the invention is to provide a system for performing a complete accounting and record control job with equipment that is relatively simple, compact and reliable. Although not limited thereto, it is expected that our invention will find especial utility in inventory control, billing procedures, insurance record maintenance, payroll operations and the like.

In realization of the foregoing, the invention provides a record card having a greatly enhanced capacity for storing information thereon. Accordingly, the invention has for an aim the miniaturization of card size, thereby affording an appreciable reduction in the amount of filing space for a given amount of information to be stored and retained.

Also, a feature of the invention resides in the use of a card system that will facilitate the changing of recorded data thereon. Not only does the present invention contemplate a saving in time in making data changes, but it is planned that the cards be re-used many times, thereby reducing the number of cards that must be purchased and thus effecting a further saving. The ability to modify the recorded data as circumstances dictate renders our system especially suited for the previously mentioned business operations.

Yet another object is to provide a system utilizing a record card requiring only a simple marking operation in recording the data thereon. Further, the invention makes it possible, because of the visible markings thereon, for the card to be interpreted without the aid of scanning apparatus should the occasion arise for so doing.

Specifically, the invention has for an object the generation of certain electric pulses in accordance with information marked on a record card, and the channeling of these pulses, or more accurately pulses derived therefrom, to proper storage units from which the registered information may be withdrawn for use in the operation of certain printing equipment, such as an electric typewriter.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1C:
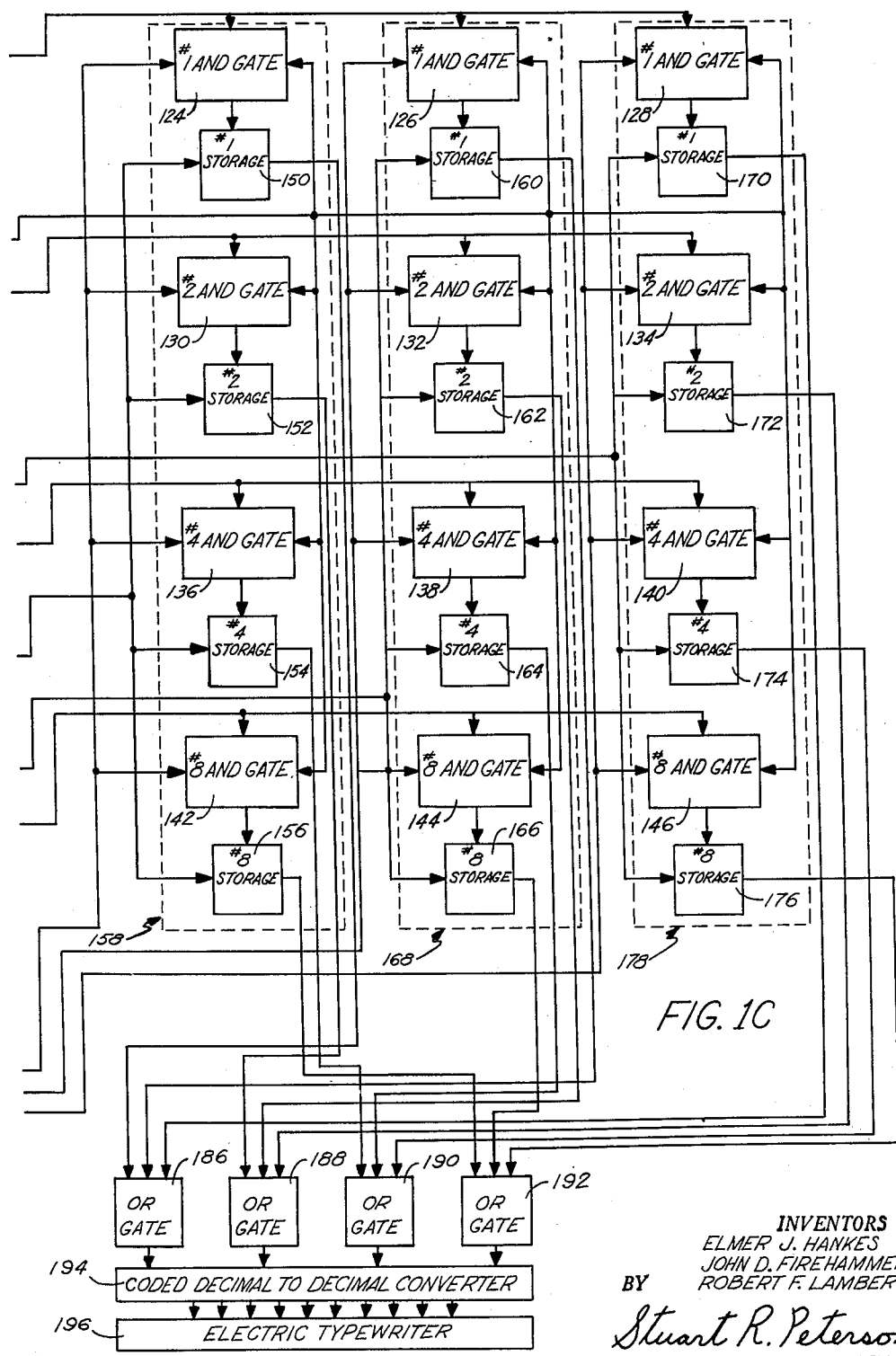
Figure 4A:
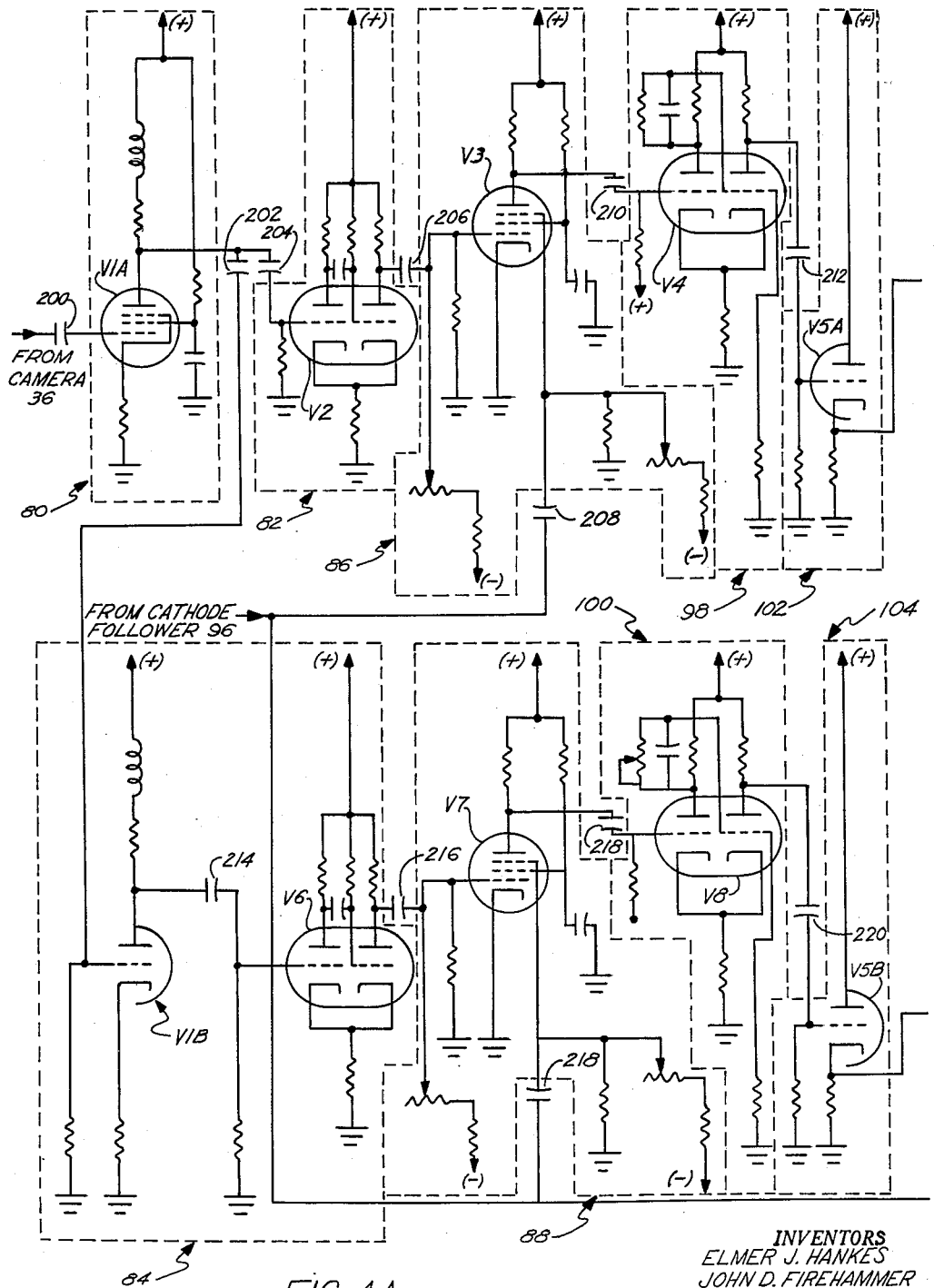
Figure 4B:
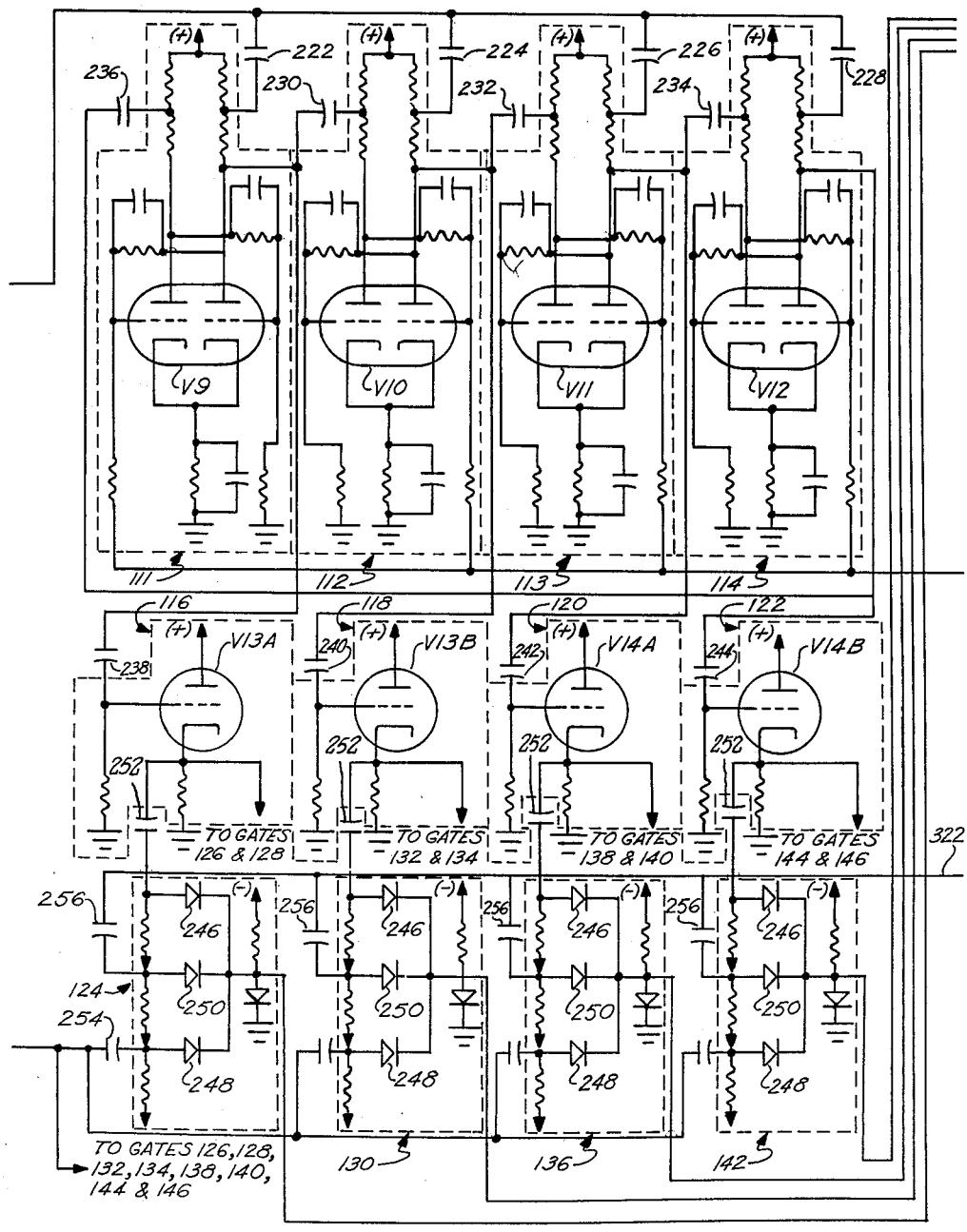

In the drawings:
FIGURES 1a, 1b and 1c when placed side by side form a combined pictorial view and block diagram of a complete data processing system exemplifying our invention;
FIGURE 2 is a plan view of the record card utilized in the practicing of our invention;

FIGURE 3 is a plan view of a template or mask employed in the projection of certain control areas onto the record card;
FIGURES 4a, 4b and 4c when placed side by side provide a schematic diagram illustrating the general circuitry of our system.

For a full comprehension and appreciation of our invention, it is essential that a basic understanding be had as to how information is recorded on the cards to be used in conjunction with the data processing system hereinafter described in detail. Accordingly, attention is first directed to FIGURE 2 where a record card 10 is pictured, the card also appearing in FIGURE 1a. Depending upon the use to be made of the card 10 certain printed information may be contained thereon, such as a customer's name or the name of a stock item, so that the card can be readily identified and filed.

More important, though, is the coded information contained on the card that is used in our automatic data processing procedure. While each card is capable of retaining a vast amount of recorded information, for purposes of simplifying the ensuing description we will assume that in effect only three spaced rows are utilized, these rows being denoted by the reference numerals 12, 13 and 14. For instance, these three rows can be utilized to indicate several digital orders such as "units," "tens" and "hundreds," respectively. As will be explained more fully hereinafter the term "row" is used rather loosely, but presents a succinct way of describing the orderly arrangement that is contemplated. Each of the three rows are formed by four spaced information areas 16, 18, 20 and 22 defined by faintly printed parallel blue lines. As will be readily understood by those persons familiar with computer nomenclature, these areas 16, 18, 20 and 22 constitute a binary coded decimal system, the area 16 indicating a "1," the area 18 a "2," the area 20 a "4" and the area 22 an "8."

To record bits of information, the appropriate information areas, in accordance with the teachings of the invention, will be darkened or marked, as with an ordinary graphite pencil or automatically by way of some mechanical mechanism, the use of a graphite pencil permitting easy erasing and change. The particular way in which the marks are applied is unimportant to a practicing of the invention. For example, if the digit "5" is to be recorded, the areas 16 and 20 would be marked; if the digit "4" is to be used, then only the area 18 would be darkened, whereas if the digit "7" is to be recorded then the areas 16, 18 and 20 would each be darkened. From FIGURE 2 it can be seen that the number "632" has been recorded by using the rows 12, 13 and 14.

If alphabetic letters are to be coded and recorded, six information areas would be used for each row. Actually, the number of information areas is virtually without limit, as long as the card is large enough to accommodate the areas. The areas can be rather small and quite close together, thereby facilitating card miniaturization for a given amount of information to be recorded.

Associated with each row 12, 13 and 14 is a permanently darkened area 24, 26 and 28. Although these areas 24, 26 and 28 may be applied manually with a pencil, they will usually be printed on each card. These areas or marks 24, 26 and 28 perform a triggering role for scanning apparatus yet to be explained. Therefore, more will be said later on about these triggering areas and how they assure only a single scan for each row 12, 13 and 14.

Describing now the apparatus employed in the automatic reading of the information recorded on the card 10, reference should be had to FIGURE 1a where a card feeding mechanism is illustrated. The feeding mechanism is denoted in its entirety by the reference numeral 30 and comprises an elongated table or support 32 along which each record card 10 is advanced by a plurality of feed rollers 34, the rollers being driven in unison by a motor 35.

Superimposed above the feeding mechanism 30 is a television camera 36 mounted at the upper end of a standard 38. Inasmuch as the cards 10 will be of relatively small dimensions, the pickup tube used in the television camera should possess good target sensitivity. The Vidicon tube is ideally suited for the use to which it is to be put in this situation. The operational principles of this tube are well known and need not be dealt with at this time. Although only a horizontal scan is actually necessary, inasmuch as the card 10 is moving, it is planned that commercially available television equipment be utilized, so therefore the usual camera controls including a blanking circuit are contemplated, these controls being denoted generally by the numeral 40 and having associated therewith the customary synchronizing pulse generator which has been termed a horizontal sync pulse generator 41 in this situation. Specific reference will be made to the generator 41 hereinafter and this is why it has been pictured as being appurtenant to the more general controls 40. In the exemplified situation we will assume that the vertical deflection coils have applied thereto only a constant potential, since no vertical scan is needed as above stated. For a longer Vidicon tube life, the camera 36 should be tilted occasionally with a concomitant adjustment of said constant potential. In this way different sections of photoconductive material within the Vidicon will be exposed to the electron scanning beam and thus contribute to the above-mentioned longer tube life.

A suitable source of illumination has been given the numeral 42. The source 42 provides what may be termed a reference or general level of illumination for the card 10. A second light source 43 is contained in a projector 44 also mounted on the standard 38. The projector 44 may be of ordinary construction and as shown has a slot 46 for the reception of a template or mask 48 best viewed in FIGURE 3. The mask 48 is generally opaque but has four spaced transparent portions or openings 50, 52, 54 and 56 through which light may pass. The light source 43 within the projector 44 is relatively bright and hence light passing through the portions 50, 52, 54 and 56 produces a high level illumination at four concentrated control areas on the card 10 indicated by the reference numerals 58, 60, 62 and 64. As can be discerned from FIGURE 2, these control areas are located somewhat to one side of the information areas 16, 18, 20 and 22 and will be similarly oriented when the rows 13 and 14 are moved into camera range. Thus, when a scanning operation takes place, the camera 36 will scan first the control area 58, then the intervening space of less light intensity, then the information area 16 which in this instance has not been darkened, then the control area 60, then the information area 18 which has been darkened and so on through the entire row 12.

It is the office of the triggering areas 24, 26, 28 to initiate a sweep, or at least make the sweep effective, only when the camera beam will encounter one of the rows 12, 13 or 14. Accordingly, a photoelectric pickup unit 66, such as a lead sulphide cell, is mounted on the standard 38 so as to be energized to a given state by light reflected from those areas of the card 10 intermediate the triggering areas. Whenever one of the control areas 24, 26 or 28 moves into range of the pickup unit 66, the current passing therethrough will be abruptly decreased due to the lower level of illumination. This in effect produces a negative pulse in a manner hereafter more fully treated and by reason of an amplifier 68 the negative pulse is both amplified and inverted. Capacitively coupled to the output side of the amplifier 68 is a shaper 70 for producing a pronounced square wave pulse having a predetermined time duration. Because of the capacitive coupling between the amplifier 68 and shaper 70, only a single output pulse is derived from the shaper for each black mark 24, 26 and 28 that is encountered.

While there is a dual utilization of the output pulse from the shaper 70, we will deal at this time only with one use, reserving the second use for later discussion. Accordingly, a current amplifier 72 is connected to the shaper 70 so as to operate a relay 74 equipped with normally open contacts in circuit with the operating coil of a stepping switch 76. The stepping switch itself has two levels or banks of contacts 76a and 76b actuated in unison. Stepping switches of the type employed are now regarded as conventional and need not be described in detail other than to say that energization of their operating coils actuates or cocks a pawl which moves against a spring supplied bias. No contact movement takes place until deenergization of the operating coil. Consequently, when the relay 74 picks up and energizes the coil of stepping switch 76 no contact advancement occurs at the precise moment of energization.

However, the energization of the relay 74, and hence the stepping coil, is only momentary because there is only a single relatively short pulse emitted from the shaper 70 for each mark 24, 26 and 28, owing to the capacitive coupling of said shaper 70 to the amplifier 68. Each contact level has three contacts in the illustrated embodiment, one for each row 12, 13 and 14, as will be better understood as the description progresses. All that need be appreciated at this time is that the wiper arm of each contact level becomes engaged with a specified contact in order that the information contained in row 12 will be correctly channeled to the proper storage means yet to be referred to.

As is usual, the television camera 36 is equipped with a video preamplifier and the output information from this integral preamplifier is delivered to a video amplifier 80. The output information consists, in the present instance, of negative pulses derived from the projected spots of high intensity light, i.e. the control areas 58, 60, 62 and 64, and positive pulses corresponding to the black marks, i.e. the information areas 18 and 22 since we initially assumed that only these two areas would be darkened to give the arbitrary number "5" for row 12. After amplification and inversion the information areas 18 and 22 are now represented by positive pulses and, conversely, the control areas 58, 60, 62 and 64 by negative pulses. Both a positive pulse discriminator 82 and a negative pulse discriminator 84 are connected to the amplifier 80 so as to separate the two types of pulses into two channels. Each discriminator 82, 84 puts out a positive pulse of only 5 microseconds' duration. To the positive pulse discriminator 82 is connected a coincidence detector 86, whereas to the discriminator 84 is connected a coincidence detector 88.

Obviously, we wish to obviate any double scanning. In this regard it will be recalled that the shaper 70 emitted a single positive square wave pulse for the triggering area 24. One use of this shaped pulse has already been presented. The second use is to impress this pulse upon one input of an AND gate 90. Likewise, there is a connection from the sync generator 41 to the other input of the gate 90. Consequently, whenever both a sync signal and a shaper signal are simultaneously present, an output pulse from the gate 90 is delivered to a phantastron gate generator 92 so as to produce a negative pulse of 55 microseconds' duration. This pulse is amplified and inverted by an amplifier 94, to which a cathode follower 96 is connected. The cathode follower 96 is connected to each coincidence detector 86 and 88, and is additionally connected to the #1 contact level 76a of the stepping switch 76. More will be said presently concerning the connection of this cathode follower to the stepping switch.

Through the use of the coincidence detectors 86, 88 and the time-controlled pulses impressed thereon, no pulses are permitted to pass during the fly back time, the 55 microsecond pulses being purposely too brief to allow this. Because the time base of the pulses from the discriminators 82, 84 is only 5 microseconds, the pulses from the coincidence detectors will be only of this 5 microsecond duration.

The 5 microsecond pulse from the detector 86 is forwarded to a shaper 98, whereas the 5 microsecond pulse from the detector 88 is applied to a shaper 100. The shapers 98, 100 both act to produce square wave pulses of a predetermined voltage magnitude which are fed to respective cathode followers 102 and 104.

Therefore, it will be recognized that signals derived from the information areas and control areas have been initially segregated and kept segregated by the foregoing circuitry.

Continuing now with a description relating exclusively to the handling of the pulses produced by the control areas, and specifically the areas 58, 60, 62 and 64 under our assumed set of conditions, it will be explained that any output from the cathode follower 102 is fed simultaneously to four binary flip-flops 111, 112, 113 and 114. Under the binary coded decimal system earlier referred to we will now assign the value "1" to the flip-flop 111 the value "2" to the flip-flop 112, the value "4" to the flip-flop 113 and the value "8" to the flip-flop 114. This assignment of numbers will be better understood as the description progresses.

As is generally known, a flip-flop has two distinct stable states, one of which is called the "one" state and the other the "zero" state. In the present flip-flop circuitry the flip-flop 111 is normally in its "one" state whereas the three remaining flip-flops are all in their "zero" states. The coupling of the flip-flops 111–114 is arranged so that a negative pulse from the cathode follower 102 will alter the state of a flip-flop only if it is in its "one" state, then flipping it to its "zero" state. Thus, when the flip-flop 111 is flipped to its "zero" state because of a negative pulse forwarded from the cathode follower 102, it will flip the succeeding flip-flop 112 to its "one" state. More will be said about the changing of stable states during the ensuing operation sequence.

Connected to the four flip-flops is a plurality of cathode followers 116, 118, 120 and 122, the follower 116 being associated with the flip-flop 111 so as to receive a pulse from this flip-flop when its state is changed from the "one" state to the "zero" state. Also each of the other three cathode followers 118, 120 and 122 will receive a pulse from their respective flip-flops when changed from a "one" state to a "zero" state.

The output from the cathode follower 116 is simultaneously impressed upon one input of three-input AND gates 124, 126 and 128. The output from the cathode follower 118 is likewise simultaneously impressed on one input of three-input AND gates 130, 132 and 134. Similarly, the output from the cathode follower 120 is simultaneously applied to one input of three-input AND gates 136, 138 and 140, whereas the output from cathode follower 122 is fed simultaneously to one input of three-input AND gates 142, 144 and 146.

The output from the cathode follower 104 is simultaneously applied to the second input of all of the AND gates 124–146.

Previously, itw as brought out that the output signal from the cathode follower 96 was fed to the wiper arm of the #1 contact level 76a of the stepping switch 76, as well as to the two coincidence detectors 86, 88. We are now concerned with the channeling of such signal to the various AND gates labeled 124–146. Accordingly, the first contact of the #1 contact level 76a is connected directly to the third input of the AND gates 124, 130, 136 and 142. The second contact of the #1 contact level 76a leads directly to the third input of the AND gates 126, 132, 138 and 144. The third contact of this level leads directly to the third input of the remaining AND gates 128, 134, 140 and 146. Since the stepping switch 76 is stepped in accordance with the particular row 12, 13 and 14 being scanned, it follows that the information read from a particular row will be properly channeled by reason of the AND gates 124–146.

The output from each AND gate 124–146 is fed to a storage unit connected thereto. These storage units are in the form of additional flip-flops and normally are all in their "zero" stable state. The storage units for the AND gates 124, 130, 136 and 142 have bene designated by the reference numerals 150, 152, 154 and 156, respectively. Because this group of AND gates and storage units handle information from the "units" row 12 they have all been included in the dashed rectangle labeled 158 and function as a "units" register. The storage units for the AND gates 126, 132, 138 and 144 have been assigned the numerals 160, 162, 164 and 166, respectively, and are included in the rectangle 168 and function as a "tens" register, since they collectively deal with information from the "tens" row 13 which will be the previously selected "3." Likewise, the storage units 170, 172, 174 and 176 are connected to the outputs of the AND gates 128, 134, 140 and 146, respectively, all being in the rectangle 178 and function as a "hundreds" register to handle the digit "6" that has been referred to, inasmuch as these AND gates and storage units handle information contained in the "hundreds" row 14.

It is the office of the #2 contact level 76b of the stepping switch 76 to trigger in proper succession three readout pulse generators 180, 182 and 184. To do this, the wiper arm of the #2 level 76b is connected to a positive potential and the readout pulse generator 180 is connected to the second contact (not the first) of this level so that after the information from the row 12 has been entered into the storage units of the bank 158 when the first contact of the #1 level 76a is active the information will be read out upon advancement of the stepping switch 76 to its second contact. The heavy current produced by the generator 180 flips any of the storage units 150, 152, 154 and 156 to their "zero" state providing they have been driven previously to their "one" stable state. Of course nothing happens whenever a storage unit is in its "zero" state but an output pulse will be produced whenever a storage unit is in its "one" state and returned to its "zero" state. In the illustrated situation the contacts of the #2 level 76b are also connected to a flip-flop reset circuit 185 which may be used to return the flip-flops 111, 112, 113 and 114 to their normal states in preparation for receiving further signals. Normally, though, because of the "ring" connection of these flip-flops, the reset 185 will not be needed.

An OR gate 186 has its three inputs connected to the outputs of the storage units 150, 160 and 170. Similarly, an OR gate 188 has its inputs connected to the outputs of the storage units 152, 162 and 172. Also, an OR gate 190 has its inputs connected to the outputs of the storage units, and an OR gate 192 has its three inputs connected to the storage units 156, 166 and 176.

Each OR gate 186, 188, 190 and 192 is in turn connected to a coded decimal to decimal converter 194. Under our assumed set of conditions the digit "2" will have been recorded in the storage units bearing the reference numeral 152, and hence the OR gate 188 will have transmitted a pulse signal to the converter 194 which will produce an appropriate signal to an electric typewriter 196 which will trigger and actuate the type carrying the number 2 thereon representative of the "units" value. The typewriter then automatically spaces itself in preparation for receipt of the "tens" value which is to follow and then spaces itself for the "hundreds" value. In this way any number up to "999" can be handled by the system herein set forth and described. In actual practice the system would be expanded to handle additional digital orders, and in many situations the full alphabet, this being done through the employment of more stepping switch contacts, together with supplemental banks corresponding to the three banks 158, 168 and 178. With the three order system exemplified, it is felt that the expansion thereof will be readily apparent.

While it is believed that sufficient information has been given by which a person familiar with this art could construct our system, nonetheless a schematic wiring diagram is pictured. This diagram is set forth in FIGURES 4a, 4b, 4c and 4d, which individual figures when placed side by side constitute the complete diagram. Therefore, referring to these figures, it will be seen that the video amplifier 80 includes one section V1A of a twin pentode vacuum tube V1, such as a 5970 tube, having its control grid coupled to the pre-amplifier of the television camera 36 via a capacitor 200. The plate of the tube section V1A is connected to the grid of the tube section V1B belonging to the negative pulse discriminator 84 through a capacitor 202 and to the grid of a twin triode tube V2, such as a 5963 tube, via a capacitor 204. The tube V2 is part of the positive pulse discriminator 82 and is connected as a one shot multivibrator biased such that only positive pulses will trigger it.

Coupled to the plate of the second section of the tube V2 by a capacitor 206 is a twin pentode V3, such as a 6BU8 tube, this tube being part of the coincidence detector 86. Coincidence at this locus is between the discriminator 82 and the gate generator 92, the suppressor grid of the tube V3 being coupled to the cathode follower 96 by a capacitor 208 in the realization of the coincidence achievement. More specifically, V3 allows pulses to pass only during useful portions of the first scan of rows 12, 13 or 14. The output from V3 is fed to the first grid of a double triode tube V4, such as a 5963 tube, comprising the shaper 98, capacitive coupling being realized through the medium of a capacitor 210.

The shaper 98, a Schmitt trigger circuit, has the cathodes of the tube V4 coupled together and the tube is biased such that for each small amplitude negative input pulse applied to said first grid, it will put out a 90 volt negative pulse of the same time duration. The plate of the second half of tube V4 is coupled through a capacitor 212 to the cathode follower 102, the cathode follower comprising one section V5A of a double triode tube V5, such as a 12AU7 tube.

In addition to the section V1B the negative pulse discriminator includes a double triode V6 of the same type as V2 the tube V6 being coupled to the plate circuit of tube section V1B by way of a capacitor 214.

Like the coincidence detector 86, the coincidence detector 88 includes a pentode, this pentode being labeled V7. The tube V7 has its control grid coupled to the plate of the second half of the tube V6 through a capacitor 216, and its suppressor grid is coupled to the cathode follower 96 through a capacitor 218. In this way a signal is prevented from progressing through the system via this route during fly back time just as a signal is precluded from passing through the detector 86 during this specific period. This also prevents a duplicate registration of any single row.

As with the shaper 98, the shaper 100 includes a double triode, bearing in this instance the character V8. Coupling is provided by a capacitor 218. Similarly, a capacitor 220 furnishes the coupling between the other section V5B of the double triode V5, the section V5B constituting the cathode follower 104.

The cathode follower 102 serves as a coupling device to the string of flip-flops 111, 112, 113 and 114. These four flip-flop circuits are all in accordance with the well known Eccles-Jordan principle and need not be described in detail. However, it will be pointed out that the flip-flop 111 includes a double triode V9 suggestively of the 5963 type. The circuit constants relating to this circuitry are such that the left side will normally be conducting. In relation to the tubes V10, V11 and V12 belonging to the flip-flops 112, 113 and 114, respectively, which have their right sides normally conducting the tube V9 can be said to be normally in its "one" stable state, whereas the tubes V10, V11 and V12 will be referred to as being normally in their "zero" stable state.

Each tube V9, V10, V11 and V12 has its right side or section connected to the cathode follower 102 through individual capacitors, these capacitors having been designated by the reference numerals 222, 224, 226 and 228. Between flip-flops are capacitors 230, 232, 234 and 236, these capacitors serving to connect the flip-flops 111, 112, 113 and 114 in cascade for 1-2-4-8 operation. During the subsequent operational portion of the description more will be said concerning the inter-functioning of these flip-flops and the particular role they play.

Responsive to these various flip-flops 111–114 are the four cathode followers 116, 118, 120 and 122. The cathode followers 116 and 118 may be composed of a double triode tube V13 having one section V13A devoted to the follower 116 and its second section V13B assigned to the follower 118. Similarly, the cathode followers 120 and 122 may be comprised of a double triode V14, having sections V14A and V14B. The tube sections V13A, V13B, V14A and V14B are coupled to the plates of the right sections of the tubes V9, V10, V11 and V12 by way of capacitors 238, 240, 242 and 244, respectively.

While the AND gates 124–146 may assume a variety of configurations, the ones selected for the particular office they are intended to fill, however, are illustrated on page 400 of Pulse and Digital Circuits by Millman and Taub, published by McGraw-Hill Book Company, Inc. in 1956. The circuitry herein depicted, however, differs from that in the Pulse and Digital Circuits book by reason of the fact that our AND gates are operable upon receipt of simultaneously applied negative pulses. Accordingly, the various diodes labeled 246, 248 and 250 are reversed. To save drawing space only the AND gate circuitry for the AND gates 124, 130, 136 and 142 of the register 158 has been illustrated in detail, it being understood that the circuitry in actual practice is repeated for the AND gates belonging to the higher order registers 168 and 178. The diodes 246 are coupled to the cathodes of the tubes V13 and V14 by capacitors 252. This accounts for one input of each AND gate 124–146 and their respective connections into the overall system circuitry although only circuitry has been presented for four of these gates.

The second input of each AND gate 124–146 includes the diodes 248, these diodes having respective coupling to the cathode of tube section V5B of the cathode follower 104 through capacitors 254.

The third inputs of the AND gates 124–146 involving the various diodes 250 are coupled to the #1 contact level 76a of the stepping switch 76 via various capacitors 256.

Next to be referred to are the various storage devices 150–156, 160–166 and 170–176. Here again the storage devices of the registers 168 and 178 are mirror images of the storage devices 150–156, so only detailed circuitry for the "units" register 158 will be described, this being to simplify the drawings. The storage devices 150–156 in the form of flip-flops include tubes V15, V16, V17 and V18, respectively corresponding to the previously mentioned tubes V9, V10, V11 and V12 of the flip-flops 111–114. All of the flip-flops 150–156, however, are in their "zero" state initially. Coupling of the tube V15 to the output of the AND gate 124 is via a capacitor 260 and the other tubes V16, V17 and V18 are likewise connected to the AND gates 130, 136 and 142 through capacitors 262, 264 and 266.

Through the media of capacitors 268, 270, 272 and 274 the various storage devices or flip-flops 150–156 are coupled to the various OR gates 186–192. While only one diode 294 is pictured for the OR gate 186, it will be appreciated that three such diodes are utilized, there being a diode for each register 158, 168 and 178. Similarly, a diode 296 is associated with the OR gate 188 plus two more than do not appear. Also, a diode 298 is utilized in conjunction with the OR gate 190 together with two additional ones, and finally a diode 300 plus two unillustrated ones help make up the OR gate 192.

For a detailed presentation of the exemplary coded decimal to decimal converter 194, the reader is referred to the binary to decimal decoder of the Burroughs Corporation, Electronic Tube Division, Plainfield, New Jersey, which is set forth in block form on this company's drawing No. 70186 dated November 19, 1957. It will be readily understood that the ten outputs of the converter 194 are capable of operating the electric typewriter 196, as far as the typing of numbers is concerned.

Reverting now to a more detailed explanation of the circuitry associated with the photo-electric cell 66, it will first be stated that the cell may be of the CE705 type. This cell 66 is connected to the control grid of tube V21, such as a 6AU6 pentode belonging to the amplifier 68, the connection being by way of a capacitor 302. The use of the capacitor 302 is important as only a pulse signal is desired, actually one pulse for each mark 24, 26 and 28, as will become better apparent during the operational sequence.

As with the shapers 98 and 100 the shaper 70 may comprise a Schmitt trigger circuit including a twin triode V22 such as a 5965 tube. However, the shaper 70 receives a positive pulse rather than a negative pulse and emits a rectangular positive pulse rather than a negative pulse. Through a capacitor 304 the shaper 70 is connected to the grid of a triode tube V23, this tube constituting the amplifier 72 for the relay 74 which includes a coil 306 and a pair of normally open contacts 308.

The contacts 308, when closed, furnish energizing current to the operating coil 310 of the stepping switch designated generally by the numeral 76. Through a spring actuated pawl and ratchet (not shown) triggered by the coil 310 the shaft 312 is rotated after each energization of the coil 310. A first wiper arm 314 forming part of the #1 level 76a successively engages contacts 316, 318 and 320 as the arm 314 is successively advanced. Contact 316 is connected directly to the capacitors 256 of the AND gates 124, 130, 136 and 142 of the "units" register 158 via a conductor 322. It has already been stated that these capacitors provide the third input coupling for this group of gates. A conductor 324 similarly connects the contact 318 to the third input of the AND gates 126, 132, 138 and 144 of the "tens" register 168. Likewise, the contact 320 is connected to the AND gates 128, 134, 140 and 146 of the "hundreds" register 178 through the intermediary of a conductor 326. The wiper arm 314 receives its energization via a brush 328 and a conductor 330 connecting with the cathode follower 96.

The #2 contact level 76b includes three fixed contacts 332, 334 and 336, these contacts being engageable by a wiper arm 338 having a suitable potential applied thereto by a brush 340. Particular attention is to be paid to the fact that the contact 334 is connected to the readout pulse generator 180, the contact 336 to the readout pulse generator 182 and the contact 332 to the readout pulse generator 184.

Only the generator 180 is depicted in detail, being comprised of a tube V19, such as a 2D21 gas tube. Coupling is effected from the contact 334 through a capacitor 342 to the grid of the gas tube V19 so as to pulse said tube when the arm 338 moves onto the contact 334. The heavy surge of current thus generated by the firing of the tube V19 is coupled through a transformer 334 which is in circuit with those grids of the tubes V15, V16, V17 and V18 of the storage devices 150, 152, 154 and 156 which are associated with the tube sections indicative of the "zero" state of these particular flip-flops. In this way the flip-flops 150–156 will be driven back to their "zero" stable state (the right hand section as viewed in the drawings) if they are not already in such a state. By so doing the desired readout from the "units" register 158 is achieved.

By the same token the connection of the readout pulse generator 182 to the contact 336 will accomplish a readout of the "tens" register 168, it being contemplated that the generator 182 comprise the same components, though not detailed in the drawings, as the generator 180. Likewise, the connection of the generator 184 to the contacts 332 will produce a readout from the "hundreds" register 178 when the wiper arm 338 moves into engagement with the contact 332.

By reason of the flip-flop reset 185 the temporary storage comprising the flip-flops 111–114 may be automatically reset, as already explained. The flip-flop reset, in its illustrated form includes a triode V20 having its grid coupled to the contact 332 via a capacitor 350 and diode 352, to the contact 334 via a capacitor 354 and diode 356, and to the contact 336 via a capacitor 358 and diode 360. Thus, whenever the wiper arm 338 comes into initial engagement with any one of the contacts 332, 334 or 336 the flip-flops 111–114 constituting the temporary storage will be immediately reset.

Backtracking somewhat to the output from the shaper 70, it will be recalled that a two-fold use of the shaper 70 output was planned. Concerning the second such use, it may be explained that the gate 90, similar to the gates 124–146, but differing therefrom in that it is a two input gate, has a diode 362 capacitively coupled to the plate circuit of tube V22 by a capacitor 364, thereby providing one input. The other input involves the use of a diode 366 and capacitor 368 connected directly to the horizontal synchronizing pulse generator 41, which need not be referred to in detail since its circuitry is well understood.

By virtue of a capacitor 370 the output of the AND gate 90 is coupled to the gate generator 92 which is in the form of a phantastron circuit involving a double diode V24, such as a 6AL5 tube, and a pentode tube V25, such as a 5725 tube. The operation of a phantastron circuit is described in conjunction with the circuit pictured on page 225 of the Pulse and Digital book already referred to.

The cathode of tube V25 belonging to the gate generator 92 connects to the amplifier 94 through a capacitor 372. The amplifier is quite conventional, consisting of a tube section V26A which may be one half of a 5963 tube. The plate of tube V26A connects to the grid of tube section V26B, this being the other half of the tube V26 and constituting the cathode follower 96 owing to the manner in which it is connected into the circuitry.

It is the cathode of V26B that connects directly to the brush 328 of the #1 contact level 76a and also to the two capacitors 208, 210 furnishing the coupling to the coincidence detectors 86, 88, respectively.

Having presented the foregoing description, the operation of our data processing system should be readily apparent. Nonetheless a brief outline of a typical operating sequence will undoubtedly be of assistance in providing a full comprehension and appreciation of the invention's merits. Accordingly, it will be assumed that in addition to the recorded units digit "2," there is a "3" for the "tens" column and a "6" for the hundreds column. Thus our complete number under the abbreviated system disclosed is "632." The "2," of course, is represented by the information appearing in row 12, the "3" by what appears in row 13 and the "6" by what is recorded in row 14. In a sense, using the term "row" is somewhat of a misnomer, for if only one information area appears, as it does in row 13, there is not really a "row" formed until the card 10 has been moved into registry with the control areas provided by the projector 44. However, for convenience of expression throughout the specification and in some of the claims, the term "row" is employed. In the specific situation depicted the rows 12, 13 and 14 may be said to include the trigger areas 24, 26 and 28, too.

Now, if the card 10 is in the process of being moved along the table 30 through the agency of the rollers 34, the arrival of the first triggering area 24 will signify a readiness of the card for the first scan thereof by the television camera 36. What takes place in accomplishing this is that some of the general illumination provided by the source 42 is reduced by the dark mark or area 24. Whereas the photoelectric cell 66 has been in a fairly high conductive state, this state is abruptly lessened due to the mark 24 coming into view. Such a happening of course produces a voltage decrease at the juncture of the capacitor 302 and the cell 66 with a concomitant decrease in the charge between the plates of said capacitor. This in turn causes the grid of V21 belonging to the photocell amplifier 68 to become more negative, thereby causing a positive output pulse to be generated in the plate circuit of the tube V21.

As a result, the stepping switch 76 is advanced, bringing the wiper arm 314 into engagement with fixed contact 316 and arm 338 into engagement with contact 332. Upon engagement of the arm 338 with the contact 332 a reset pulse is simultaneously delivered to each flip-flop 111–114 so as to return all of these storage devices to their original states, i.e. the "one" state for flip-flop 111 and the "zero" state for the flip-flops 112–114. The registers 158, 168 or 178 will not be affected because the AND gates 124–146 require an output from the cathode follower 104 to be impressed on the second input thereof before an output from any of these AND gates is produced. There is no follower output at this time.

Another thing that happens is that the information that has been accumulated in the register 158 is removed or read out by the actuation of the readout pulse generator 180, this taking place simultaneously with the arm 338 reaching the contact 332. This clears the register 158, passing the information on to the appropriate OR gates 186–192 and then to the converter 194 which in turn operates the typewriter 196. Of course several levels of staggered contacts may be used so that a readout takes place immediately after the scanning operation has occurred. We have elected to have the level 76a, however, serve the dual purpose that has been illustrated. In actual practice a faster electronic switching device might well be employed in lieu of the somewhat slower, though still quite rapid, electromechanical stepping switch. At any rate the stepping switch facilitates the explanation as to what aims are achieved.

Because the contact levels 76a and 76b are mechanically coupled, the arm 314 engages the contact 316 at the same time that the contact 332 is engaged by the arm 338 so as to connect the conductor 322 leading to the three-input AND gates 124, 130, 136 and 142 of the "units" register 158 to the cathode follower 96.

Inasmuch as one input of the gate 90 is connected to the output of the shaper 70 and the other input of this gate is connected to the horizontal sync pulse generator 41, whenever both pulses arrive at this timing AND gate 90 at the same time, the phantastron gate generator 92 will receive a positive pulse. The gate generator produces a 55 microsecond negative pulse which after inversion by the amplifier 94 is delivered to the cathode follower 96.

The same 55 microsecond pulse fed to the #1 contact level 76a is also impressed on the suppressor grid of the tubes V3 and V7 belonging to the coincidence detectors 86 and 88, respectively. Thus the detectors 86, 88 are conditioned for acceptance and passage of any signal applied to the control grids of the tubes V3 and V7 during a 55 microsecond interval. The 55 microsecond interval was selected so that the camera 36 will have sufficient time to make only one scan, thereby obviating any chance of a second scan which would provide a duplicate set of pulses.

Hence, when the camera 36 reacts to the first control area 58, which consists of a high intensity spot of light, a negative pulse will be fed to the video amplifier 80. After amplification and inherent inversion the negative pulse emerges as a positive pulse having a rather pointed peak. This peaked positive pulse triggers the one shot multivibrator provided by tube V2 of the positive pulse discriminator 82. The output from the discriminator is a 90 volt positive pulse having a time duration of 5 microseconds which is fed directly to the control grid of tube V3 belonging to the coincidence detector 86. Since the 55 microsecond pulse supplied by the follower 96 is currently being applied to the suppressor grid of tube V3, the detector puts out a 5 microsecond negative pulse which has a rather peaked or pointed configuration. This pulse is "shaped" by the shaper 98 so that a negative rectangular pulse of 90 volts is produced, this pulse still having the same 5 microsecond time base. It is the cathode follower 102 that couples the preceding circuitry to the first input of each flip-flop 111–114.

The tail or trailing end of the negative pulse transmitted by the follower 102 will flip any flip-flop that is in its "one" state to its "zero" state. With the flip-flops 111–114 all in their "reset" or normal state, only the flip-flop 111 will be in its "one" state, it being recalled that the flip-flop 111 is intentionally driven to this state initially whereas the remaining ones are all in their "zero" state. At any rate, it can be seen that the pulse from the follower 102 will drive the flip-flop 111 into its "zero" state, and in doing so causes an output pulse to be delivered to the cathode follower 116 and to the succeeding flip-flop 112. This output pulse drives the flip-flop 112 into its "one" state in which state it remains for the moment.

The cathode follower 116 immediately forwards its received pulse, i.e. the one received when the flip-flop 111 changes state, to the first input of the AND gates 124, 126 and 128. While the AND gate 124 now has a signal applied to its first and third inputs, the latter being energized via the #1 contact level 76a of the stepping switch 76, it does not at this time have any signal on its second input owing to the fact that no pulse has been forwarded from the follower 104.

When the scanning beam encounters the second control area 60, there being no intervening dark information area, the above course of events repeats itself with the follower 102 again passing a pulse to each flip-flop 111–114. At this time it is the flip-flop 112 that is in its "one" state. Therefore, it will be changed back to its "zero" state and during the process of being changed it feeds a pulse to the AND gates 130, 132 and 134. Also it changes flip-flop 113 to its "one" state.

Keeping the above action in mind for the moment, we will now go back to the progress of the scanning beam. After leaving the control area 60 the beam meets the darkened information area 18. Whereas the control areas all produced pulses that were initially negative upon arrival at the video amplifier, the black mark will provide an initially positive pulse. However, after inversion by the amplifier 80, it is then negative. Through the agency of the phase inverter V1B incorporated into the negative pulse discriminator 84, though, another inversion takes place so that the pulse actually delivered to the one shot multivibrator tube V6 is positive going. The circuit action on to the cathode follower 104 from the discriminator 84 provided by the information-area pulse is identical to that described for the control-area pulses from the discriminator 82.

From the cathode follower 104, a 5 microsecond negative pulse is impressed on the second input of all of the AND gates 124–146. It is sometime during the 5 microsecond interval, however, that the cathode follower 118 forwards the output pulse from the flip-flop 112 to the first input of the AND gates 130–134. Consequently, it should be apparent that AND gate 130 is the only AND gate having all three inputs energized at the same time. Because of this the AND gate 130 emits an output signal which is stored in the storage unit 152. It will be recalled that the storage unit 152 is actually a flip-flop, and as with the other storage units 150, 154, 156, 160–166 and 170–176 is normally in its "zero" state, the output from the AND gate 130 flipping it over into its "one" state.

From the foregoing, it is believed obvious that the relative position of the storage unit 152 is representative of the information contained in the information area 18. Stated somewhat differently, the information area 18 is the second area that could be indicative of a bit of information. Since the area 16 was not darkened, no information was represented by that area, and by the same token no change was made in the first storage unit 150, only the state of the second one having been changed.

Continuing with the operational sequence, the third control area 62 supplies another "light" pulse which travels the "upper" route in the drawing, emerging as a negative pulse from the follower 102. This pulse has the effect of changing the state of the flip-flop 113, so it is now returned to its "zero" state, which action drives the flip-flop 114 into its "one" state. No "dark" pulse follows via the "lower" route which includes the follower 104 because the information area 20 has not been darkened.

Now, when the fourth control area 64 is encountered by the camera 36 the flip-flop 114 is compelled to return to its "zero" state because of the pulse sent via the follower 102. In changing back to its "zero" state, the flip-flop 114 passes an output pulse to the flip-flop 111 which puts it back into its "one" state. Here again, no "dark" pulse follows because the information area 22 has not been darkened. Consequently, only the information area 18 effects a registration in the "units" register 158 by having flipped the storage unit 152 from its "zero" state into its "one" state.

Owing to the selection of the 55 microsecond interval and the presently employed scanning speeds, the suppressor grids of tubes V3 and V7 will have a signal applied thereto only during the forward sweep of the electron beam within the camera 36. This signal will be removed during the fly back time and consequently any information or control areas encountered during this return period will not produce a registration.

However, when the second triggering area 26 arrives beneath the photocell 66, the entire above action will be repeated. In this regard, though, the stepping switch 76 will be advanced so as to have its arms 314 and 332 engage the contacts 318 and 334, respectively. Once again there will be a resetting of the flip-flops 111-114 and a readout of the previously stored information within the register 168, all by reason of the arm 338 engaging contact 334. The arm 318, through its engagement with the contact 318, applies a signal via the conductor 324 to all of the third inputs of the AND gates 126, 132, 138 and 144 of the "tens" register 168 in preparation for the analyzing of row 13 on the card 10.

Since both the information area 16 and the information area 18 have been darkened in row 13, each of the AND gates 126 and 132 will have all three inputs activated concurrently to put out an output signal to the storage units 160 and 162.

The triggering area 28 when it comes into range of the photocell 66 initiates a repetition once again of the above. Here, though, darkening of the information areas 18 and 20 of row 14 will cause storage units 172 and 174 to be changed to their "one" states.

Inasmuch as the information contained in the registers 158, 168 and 178 is always read out in an order determined by the #2 contact level 76b, the electric typewriter will print in accordance with this arrangement. In actual practice, the "6" of our "632" would be printed first and the rows 12, 13 and 14 would be re-oriented with each other to achieve this end result. However, the consideration of the "units," "tens" and "hundreds" in the order presented is believed to simplify somewhat the preceding description.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. In a data processing system, means presenting a surface having one optical characteristic, means providing an optically recognizable information area on said surface which is optically distinguishable from said surface, means providing a plurality of optically recognizable control areas on said surface, said control areas being optically distinguishable from both said surface and said information area and the relative location of said information area with respect to said control areas being indicative of the information represented by said information area, electro-optical means for successively scanning said areas to produce an output signal for each control area and a different output signal for said information area, and means responsive to said output signals for providing an indication of the relationship of said information-area signal with said control-area signals so that the information represented by said information area is determined.

2. A data processing system in accordance with claim 1 in which said information and control areas are arranged in a row and said scanning means scans in a direction so as to scan the control area with which said information area is associated before scanning said information area.

3. A data processing system in accordance with claim 1 in which said scanning means produces an electric pulse of one polarity when scanning said control areas and a pulse of opposite polarity when scanning said information area.

4. In a data processing system, a card having a given optical characteristic, means providing an information area on said card of one light intensity which is distinguishable from said card, means providing a plurality of control areas on said card of a different light intensity so as to be distinguishable from said card and said information area, the relative location of said information area with respect to said control areas being indicative of the information represented by said information areas, electro-optical means for successively scanning said areas to produce an output signal for each control area and a different output signal for said information area, and means responsive to said output signals for providing an indication of the relationship of said information-area signal with said control-area signals so that the information represented by said information area is determined.

5. A data processing system in accordance with claim 4 in which said information area constitutes an area of relatively low light intensity and said control areas constitute areas of relatively high light intensity.

6. A data processing system in accordance with claim 4 including illuminating means for said card for producing a reference light intensity over the general surface thereof to provide said given optical characteristic, also in which said means providing said information area constitutes a dark mark on the surface of said card, and in which said means providing said control areas includes a mask having spaced light transmissive openings through which a supplemental source of illumination is projected to produce control areas having a higher light intensity than that of the general surface of said card.

7. In a data processing system, a card, means for producing a row of relatively light control areas on said card, means for producing at least one relatively dark information area having a predetermined relationship with one of said control areas so as to indicate certain information, electro-optical means for successively scanning said areas to produce a pulse having a given polarity for each control area and a pulse of opposite polarity for said information area, and means responsive to said pulses for producing a signal whenever two opposite polarity pulses are produced in succession.

8. In a data processing system, a card, means providing a row of relatively light control areas on said card, means providing a relatively dark information area adjacent a particular control area so as to be representative of certain information, electro-optical means for successively scanning said areas to produce a pulse of one polarity for each control area and a pulse of opposite polarity for said information area, an AND gate for each control area, and means for simultaneously applying signals to the inputs of that AND gate associated with said particular control area to produce an output signal, said last-mentioned means being responsive to the successive production of one polarity pulse and an opposite polarity pulse.

9. In a data processing system, a card, means providing a row of relatively light control areas on said card, means providing a relatively dark information area adjacent a particular control area so as to be representative of certain information, electro-optical means for successively scanning said areas to produce a pulse of one polarity for each control area and a pulse of opposite polarity for said information area, an AND gate for each control area, means responsive to said one polarity pulses for applying a signal to one input of each AND gate in the order that said control areas are scanned by said scanning means, and means responsive to said opposite polarity pulse for simultaneously applying a signal to the second input of each AND gate, whereby the AND gate associated with that control area having said information area adjacent thereto will produce an output signal, said input signals derived from said one polarity pulses being of insufficient time duration to overlap each other but of sufficient duration so as to produce an overlap between that signal derived from said particular control area and that signal derived from said information area.

10. In a data processing system, a card, means providing a row of relatively light control areas on said card, means providing a relatively dark information area adjacent a particular control area so as to be representative of certain information, electro-optical means for successively scanning said areas to produce a pulse of one polarity for each control area and a pulse of opposite polarity for said information area, a binary device for each control area responsive to said one polarity pulses and connected so as to emit a sequence of output signals in accordance with the production of said one polarity pulses, an AND gate having one input in circuit with each binary device, and means responsive to said opposite polarity pulse for applying a signal to the second input of each AND gate, whereby coincidence of input signals will result on that AND gate in circuit with the binary device for said particular control area having adjacent thereto said information area.

11. A data processing system in accordance with claim 10 including a storage unit connected to the output of each AND gate.

12. In a data processing system, a card, means for producing in effect a plurality of rows of relatively light control areas on said card, means for producing a relatively dark information area adjacent a particular control area of each row so as to be representative of certain information, electro-optical means for successively scanning each row to produce a pulse of one polarity for each control area and a pulse of opposite polarity for each darkened information area, an AND gate for each control area of each of said rows having three inputs, means responsive to said one polarity pulses for applying a signal to one input of each AND gate in the order that said control areas are scanned by said scanning means, means responsive to said opposite polarity pulses for simultaneously applying a signal to the second input of each AND gate, and means for applying a signal to the third inputs of those AND gates for the first row during scanning thereof and then to the third inputs of those AND gates for the second row during scanning thereof, whereby an AND gate will produce an output signal only when three input signals are simultaneously applied thereto which will thus provide an indication of the information contained in a particular row.

13. A data processing system in accordance with claim 12 in which said means responsive to said one polarity pulses includes a plurality of binary devices corresponding in number to the number of control areas in one of said rows.

14. A data processing system in accordance with claim 13 including a storage unit connected to the output of each AND gate.

15. In a data processing system, a card having a plurality of darkened information areas thereon, means for moving said card, means for providing a general level of light intensity on said card, means for projecting a plurality of relatively high intensity light areas for control purposes onto said card in a preferred relation to said information areas, electro-optical means for successively scanning said control areas each time that an information area is moved into alignment therewith, said electro-optical means producing a pulse of one polarity for each control area during a scan and a pulse of opposite polarity for each information area encountered during a scan, a plurality of AND gates having three inputs each, means responsive to said one polarity pulses for applying a signal to one input of each AND gate in the order that said control areas are scanned by said scanning means, means responsive to said opposite polarity pulses for simultaneously applying a signal to the second input of each AND gate, and means for applying a signal to the third inputs of only those AND gates intended to be associated with the first information area when said information area is moved into alignment with said control areas by said moving means and a scan is being accomplished, said last-mentioned means later applying a signal to the third inputs of only those AND gates intended to be associated with the second information area when said second information area is moved into alignment with said control areas by said moving means, whereby an AND gate will produce an output signal only when three input signals are simultaneously applied thereto and thus provide an indication of the information recorded on the card by reason of the location of said information areas thereon.

16. A data processing system in accordance with claim 15 including a darkened triggering area in transverse alignment with each information area, said means for applying a signal to the third inputs of said AND gates including a photo-electric pickup unit and a stepping switch in circuit therewith, said stepping switch having contacts connected to said third inputs.

17. In a data processing system, a card, means providing a row of relatively light control areas on said card, means providing a relatively dark information area adjacent a particular control area so as to be representative of certain information, electro-optical means for successively scanning said areas to produce a pulse of one polarity for each control area and a pulse of opposite polarity for said information area, an AND gate for each control area having first and second inputs, means responsive to said one polarity pulses for energizing the first input of each AND gate in succession as said control areas are scanned, and means responsive to said opposite polarity pulse for simultaneously energizing the second inputs of said AND gates when said information area is scanned, whereby an output is produced from the AND gate corresponding to said particular control area due to the energization of its first and second inputs.

18. A data processing system in accordance with claim 17 in which said one polarity responsive means includes a flip-flop circuit connected to the first input of each AND gate.

19. A data processing system in accordance with claim 18 including a storage unit connected to the output of each AND gate for indicating when an output has been produced by that AND gate to which it is connected.

References Cited in the file of this patent
UNITED STATES PATENTS

| | | |
|---|---|---|
| 2,596,741 | Tyler et al. | May 13, 1952 |
| 2,659,072 | Coales et al. | Nov. 10, 1953 |
| 2,714,841 | Demer et al. | Aug. 9, 1955 |
| 2,714,843 | Hooven | Aug. 9, 1955 |
| 2,830,285 | Davis et al. | Apr. 8, 1958 |
| 2,855,539 | Hoover | Oct. 7, 1958 |
| 2,907,985 | Doersam et al. | Oct. 6, 1959 |

OTHER REFERENCES

"Technical Details of Print Reader Demonstrator," National Bureau of Standard Report, #3634, Aug. 20, 1954, Fig. 1 relied on.

"A New Approach to Information," from Control Engineering, August 1955.